(12) United States Patent
Martin et al.

(10) Patent No.: US 9,672,025 B2
(45) Date of Patent: Jun. 6, 2017

(54) ENCRYPTION FOR TELEMATICS FLASHING OF A VEHICLE

(71) Applicant: Ford Global Technologies, LLC, Dearborn, MI (US)

(72) Inventors: Douglas Raymond Martin, Canton, MI (US); Mark Anthony Rockwell, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/565,899

(22) Filed: Dec. 10, 2014

(65) Prior Publication Data
US 2016/0170733 A1    Jun. 16, 2016

(51) Int. Cl.
| H04L 29/06 | (2006.01) |
| G06F 9/445 | (2006.01) |
| G06F 21/60 | (2013.01) |
| H04L 9/08 | (2006.01) |
| H04L 9/06 | (2006.01) |

(52) U.S. Cl.
CPC ............... *G06F 8/65* (2013.01); *G06F 8/665* (2013.01); *G06F 21/602* (2013.01); *H04L 9/065* (2013.01); *H04L 9/0838* (2013.01)

(58) Field of Classification Search
CPC ..... H04L 9/065; H04L 9/0838; H04L 9/0861; H04L 9/0866; H04L 9/16; H04L 9/18
See application file for complete search history.

(56) References Cited

U.S. PATENT DOCUMENTS

| 1,310,719 | A | 7/1919 | Vernam |
| 5,787,367 | A | 7/1998 | Berra |
| 7,660,902 | B2 | 2/2010 | Graham et al. |
| 8,532,300 | B1 | 9/2013 | Searles |
| 8,533,474 | B2 | 9/2013 | Schneider |
| 8,625,791 | B2 | 1/2014 | Massoudi et al. |
| 8,838,748 | B2 | 9/2014 | Nair et al. |
| 8,849,494 | B1 | 9/2014 | Herbach et al. |
| 9,501,061 | B2 | 11/2016 | Chen et al. |
| 2002/0002675 | A1 | 1/2002 | Bush |
| 2004/0056770 | A1 | 3/2004 | Metcalf |
| 2006/0041337 | A1 | 2/2006 | Augsburger et al. |
| 2009/0119657 | A1* | 5/2009 | Link, II ............... G06F 8/65 717/171 |
| 2010/0012774 | A1 | 1/2010 | Fanucci et al. |
| 2010/0191973 | A1 | 7/2010 | Huntzicker et al. |
| 2010/0211787 | A1 | 8/2010 | Bukshpun et al. |
| 2012/0030470 | A1 | 2/2012 | Jdanov et al. |

(Continued)

*Primary Examiner* — Edward Zee
(74) *Attorney, Agent, or Firm* — Jennifer M. Stec; Brooks Kushman P.C.

(57) ABSTRACT

A vehicle may receive an encrypted software update responsive to an update request to an update server; identify a key offset into a long key stored to the vehicle according to a timestamp of the update request; and decrypt the encrypted software update according to the long key indexed to the key offset. An update server may receive, from a vehicle, an update request including a timestamp and a vehicle identifier; retrieve a long key according to the vehicle identifier; identify a key offset into the long key according to a timestamp of the update request; and encrypt a software update into an encrypted software update to send to the vehicle according to the long key indexed to the key offset.

17 Claims, 4 Drawing Sheets

(56) References Cited

U.S. PATENT DOCUMENTS

| | | |
|---|---|---|
| 2012/0324233 A1 | 12/2012 | Nguyen et al. |
| 2013/0061044 A1 | 3/2013 | Pinkus et al. |
| 2013/0310010 A1 | 11/2013 | Yi et al. |
| 2014/0067491 A1 | 3/2014 | James et al. |
| 2014/0270172 A1 | 9/2014 | Peirce |
| 2014/0282470 A1* | 9/2014 | Buga .................. G06F 8/65 717/170 |
| 2015/0163306 A1 | 6/2015 | Nakagawa |
| 2015/0166009 A1 | 6/2015 | Outwater et al. |
| 2015/0260826 A1 | 9/2015 | Shue |
| 2015/0334113 A1 | 11/2015 | Angus et al. |
| 2015/0350914 A1 | 12/2015 | Baxley et al. |
| 2015/0351084 A1 | 12/2015 | Werb |
| 2016/0125735 A1 | 5/2016 | Tuukkanen |

\* cited by examiner

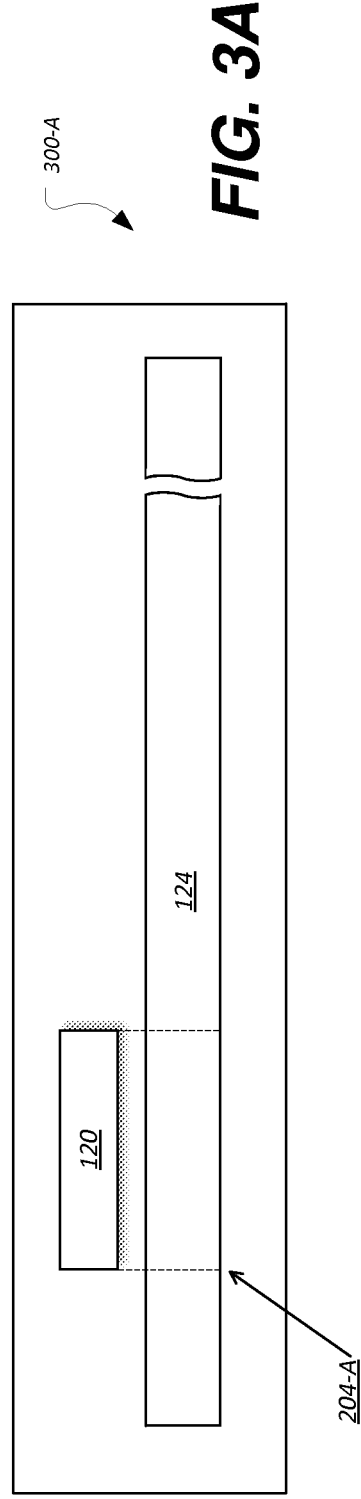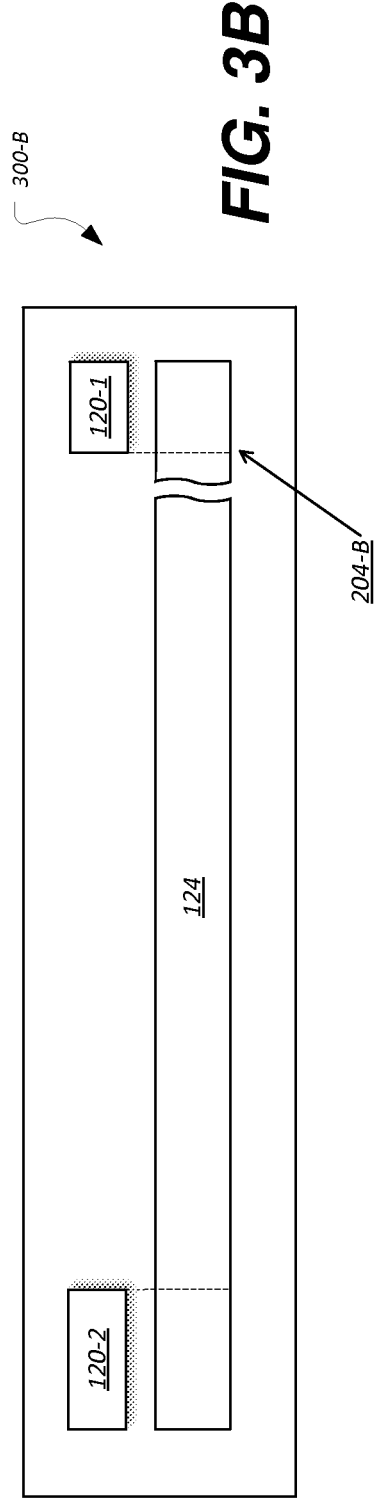

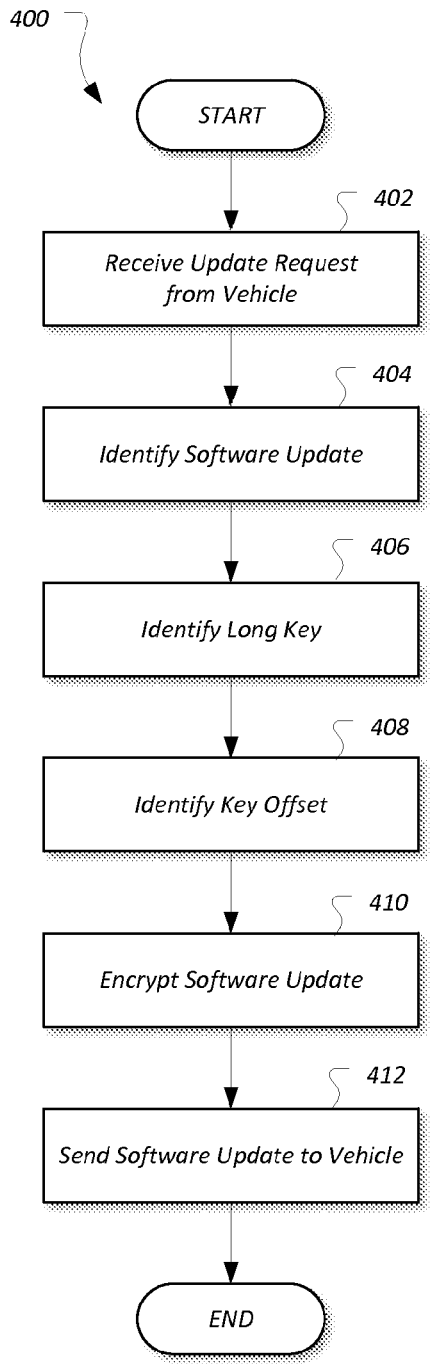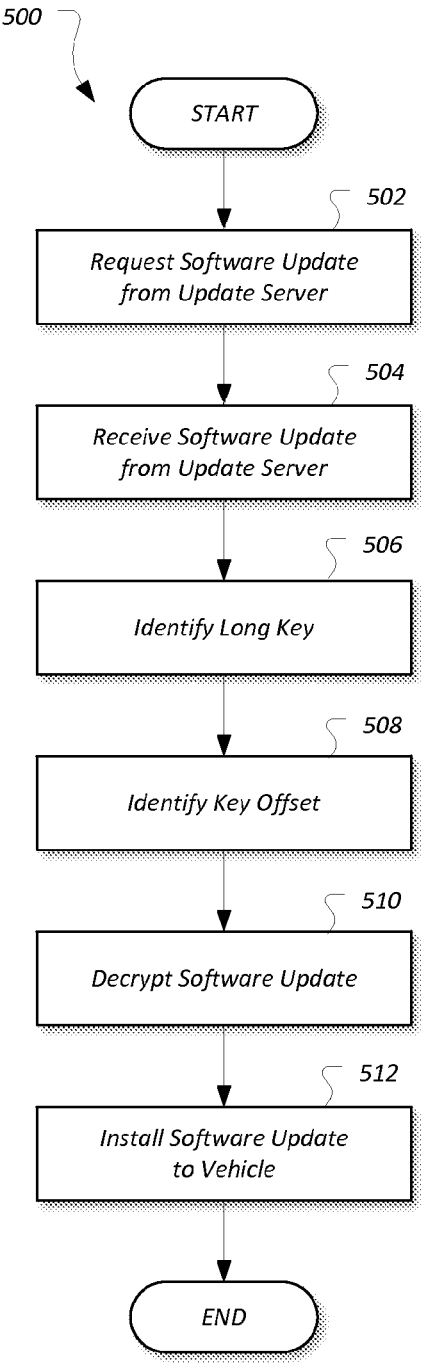
FIG. 4
FIG. 5

ENCRYPTION FOR TELEMATICS FLASHING OF A VEHICLE

TECHNICAL FIELD

Aspects of the disclosure relate to systems and methods for encryption of software updates for vehicle systems.

BACKGROUND

Vehicular software systems are becoming ever increasingly complex. Many vehicles now on the road have numerous software modules associated therewith. Powertrain control, infotainment, navigation and a number of other systems are controlled by hardware and software. Given the complex nature of these systems, and the number of software and hardware components, there are frequently updates that could be useful to vehicle owners.

SUMMARY

In a first illustrative embodiment, vehicle system includes a processor configured to receive an encrypted software update responsive to an update request to an update server, identify a key offset into a long key stored to the vehicle according to a timestamp of the update request, and decrypt the encrypted software update according to the long key indexed to the key offset.

In a second illustrative embodiment, a system includes a processor configured to receive, from a vehicle, an update request including a timestamp and a vehicle identifier; retrieve a long key according to the vehicle identifier; identify a key offset into the long key according to a timestamp of the update request; and encrypt a software update into an encrypted software update to send to the vehicle according to the long key indexed to the key offset.

In a third illustrative embodiment, a computer-implemented method includes computer-implemented method for a vehicle includes receiving, by a processor, an encrypted software update responsive to an update request to an update server; identifying, by the processor, a key offset into a long key stored to the vehicle according to a timestamp of the update request; and decrypting, by the processor, the encrypted software update according to the long key indexed to the key offset.

BRIEF DESCRIPTION OF THE DRAWINGS

FIG. 3A illustrates an example key offset into the long key for encryption or decryption of the software update;

FIG. 3B illustrates an alternate example key offset into the long key for encryption or decryption of the software update;

FIG. 4 illustrates an example process for encryption of software updates by the update server; and FIG. 5 illustrates an example process for decryption and installation of software updates by the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle software updates may be encrypted during transit to ensure that the downloaded software updates are authorized, genuine, and uncorrupted. However, many encryption methods may be reverse-engineered, or may have flaws in their implementations that reduce their effectiveness at protecting against malicious or unauthorized software updates.

An improved vehicle software update system may perform encryption and decryption using a long key that is unique to each vehicle and known by the vehicle and a remote server maintaining the software updates. As one possibility, the long keys may be maintained in a database associating unique vehicle identifiers (such as VINs) with corresponding long keys. The long key may include a random string of bytes, and may be preferably include a string of bytes that is longer than the longest software update to be encrypted.

Prior to transmission of the software update to the vehicle, the software update may be encrypted using the long key associated with the unique identifier for the vehicle to be updated. In an example, each byte of the software update may be encrypted using a corresponding byte of the long key. For instance, a first byte of the software update may be added to (or exclusive or'd (XOR) with) a first byte of the long key, a second byte of the software update may be added to (or XOR with) a second byte of the long key, and so on, until the software update is encrypted.

A timestamp value may be included in the vehicle communications with the remote server regarding the software update. This timestamp value may be used to determine a starting point offset into the long key, rather than beginning the encryption each time at the beginning of the long key. This may accordingly protect the beginning of the long key from being reused for each software update and potentially becoming vulnerable to attack (e.g., if the software update is often all zeros at the beginning, the initial bytes of the long key may be exposed repeatedly). If the end of the long key is reached before the end of the software update, the long key "rolls" over to the beginning, allowing the encryption or decryption processes to continue. Further aspects of the encryption and decryption process are discussed in detail below.

Figure 1:
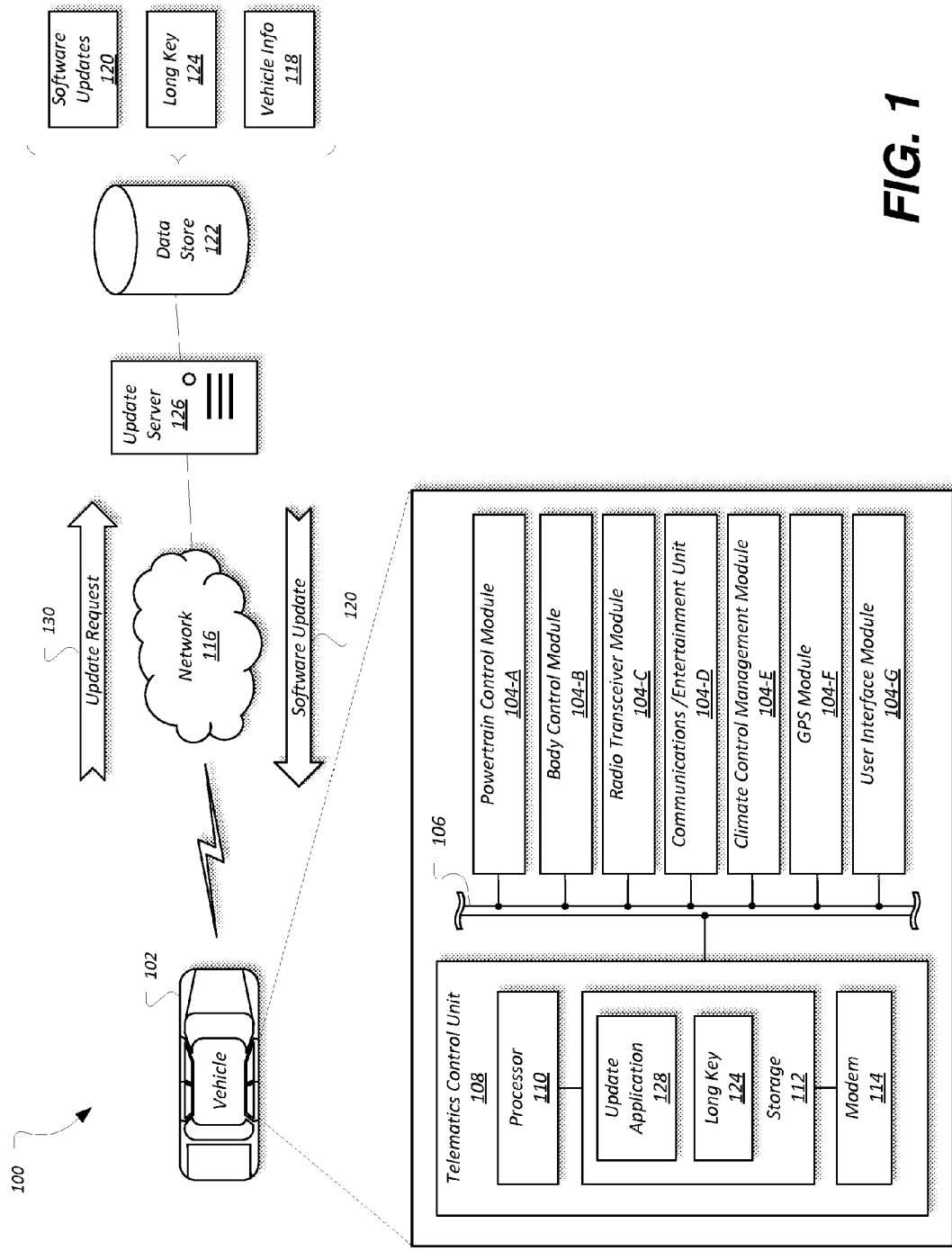
FIG. 1 illustrates an example system for providing encrypted software updates to a vehicle.

FIG. 1 illustrates an example system 100 for providing encrypted software updates 120 to a vehicle 102. The system 100 may include a telematics control unit 108 having a modem 114 in communication over a network 116 with an update server 126 (e.g., directly, or via a mobile device of a vehicle occupant). The update server 126 may communicate with a data store 122 configured to maintain software updates 120 for download, as well as long keys 124 associated with vehicle information 118 and used for encryption of the software update 120. The system 100 may further include an update application 128 installed to the vehicle 102 and configured to install software updates 120 to the telematics control unit 108 itself or to other ECUs 104 of the vehicle 102. While an example system 100 is shown in FIG. 1, the example components illustrated in the Figure are not intended to be limiting. Indeed, the system 100 may have more or fewer components, and additional or alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicle 102 may have different capabilities with respect to passenger capacity, towing ability and capacity, and storage volume.

The vehicle 102 may include a plurality of electronic control units (ECUs) 104 configured to perform and manage various vehicle 102 functions under the power of the vehicle battery and/or drivetrain. As depicted, the example vehicle ECUs 104 are represented as discrete ECUs 104-A through 104-G. However, the vehicle ECUs 104 may share physical hardware, firmware, and/or software, such that the functionality from multiple ECUs 104 may be integrated into a single ECU 104, and that the functionality of various such ECUs 104 may be distributed across a plurality of ECUs 104. The vehicle ECUs 104 may include various vehicle 102 components configured to receive updates of associated software, firmware, or configuration settings.

As some non-limiting vehicle ECUs 104 examples: a powertrain control ECU 104-A may be configured to provide control of engine operating components; a body control ECU 104-B may be configured to manage various power control functions such as exterior lighting, interior lighting, keyless entry, remote start, and point of access status verification; a radio transceiver ECU 104-C may be configured to communicate with key fobs, mobile devices, or other local vehicle 102 devices; an entertainment control unit 104-D may be configured to support voice command and BLUETOOTH interfaces with the driver and driver carry-on devices; a climate control management ECU 104-E may be configured to provide control of heating and cooling system components (e.g., compressor clutch, blower fan, temperature sensors, etc.); a global positioning system (GPS) ECU 104-F may be configured to provide vehicle location information; and a human-machine interface (HMI) ECU 104-G may be configured to receive user input via various buttons or other controls, as well as provide vehicle status information to a driver.

The vehicle bus 106 may include various method of communication available between the vehicle ECUs 104, as well as between the telematics control unit 108 and the vehicle ECUs 104. As some non-limiting examples, the vehicle bus 106 may include one or more of a vehicle controller area network (CAN), an Ethernet network, and a media oriented system transfer (MOST) network.

The telematics control unit 108 may include one or more processors 110 (e.g., microprocessors) configured to execute firmware or software programs stored on one or more storage devices 112 of the telematics control unit 108. The telematics control unit 108 may further include network hardware configured to facilitate communication between the vehicle ECUs 104 and with other devices of the system 100. For example, the telematics control unit 108 may include a cellular modem 114 configured to facilitate communication with the communications network 116. The network 116 may include one or more interconnected communication networks such as the Internet, a cable television distribution network, a satellite link network, a local area network, a wide area network, and a telephone network, as some non-limiting examples. As another example, the telematics control unit 108 may utilize one or more of Bluetooth, Wi-Fi, and wired USB network connectivity to facilitate communication with the communications network 116 via the user's mobile device.

The vehicle information 118 may include information configured to identify the vehicle 102 or the configuration of the vehicle 102. For example, the vehicle information 118 may include a vehicle identification number (VIN) published to the vehicle bus 106, or subscriber identity module (SIM) information of the modem 114 such as international mobile station equipment identity (IMEI). Additionally or alternately, the vehicle information 118 may include version information for at least a portion of the hardware and software components of the vehicle ECUs 104 of the vehicle 102.

The software updates 120 may include changes to the software or settings of the vehicle 102 to address an issue with the current software or settings, or to provide improved functionality to the current software. The software updates 120 may include, for example, updated configuration settings for one or more vehicle ECUs 104, and/or updated versions of software or firmware to be installed on one or more vehicle ECUs 104. In some cases software updates 120 may include a single section, while in other cases a software updates 120 may be organized into multiple subsections, partitions, or chunks, where all the subsections may be downloaded to complete the overall software update 120 to be installed.

The data store 122 may be configured to store the software updates 120. The data store 122 may be further configured to store additional information regarding the software updates 120. For example, the data store 122 may be configured to maintain indications of which vehicle ECUs 104 are associated with which software updates 120. The data store 122 may further store information indicative of the compatibility of the software updates 120 to vehicle model or configuration. For instance, a storage entry for a software update 120 may indicate that the software update 120 is compatible with a certain make and model of vehicle 102, or that it has a dependency on a version of another vehicle ECU 104 being of a particular version or versions.

The data store 122 may be further configured to store the long key 124 used for encryption of the software updates 120. The long key 124 may include a random string of bytes or other information shared by the data store 122 and the vehicle 102. In some cases, the long key 124 may be maintained both in the storage device 112 of the telematics control unit 108 of the vehicle 102, and in the data store 122 indexed according to vehicle information 118 (e.g., VIN provided to the data store 122 as part of vehicle information 118).

The update server 126 may include one or more devices configured to serve the software updates 120 stored by the data store 122 to the vehicles 102. For example, the update server 126 may be configured to receive requests for available software updates 120 from vehicles 102. The requests may include vehicle information 118 to allow the update server 126 to query the data store 122 for software updates 120 applicable to the vehicle 102 as it is currently configured. The update server 126 may provide, responsive to the requests, indications of software updates 120 (or the software updates 120 themselves) to update the requesting vehicle 102 that may be downloaded and installed. The update server 126 may be further configured to encrypt the software updates 120 according to the long key 124, and provide the encrypted software updates 120 to devices requesting to download the software updates 120 according to the provided indications.

The update application 128 may be configured to manage the installation of software updates 120 to the vehicle 102. For example, the update application 128 may receive a command from a user requesting to check for software updates 120. As another possibility, the update application 128 may trigger a periodic check for new software updates 120. When triggered, the update application 128 may be configured to send an update request 130 to the update server 126 to inquire whether software updates 120 for the vehicle 102 are available. For example, the update application 128 may query the update server 126 using the vehicle information 118 (or, if the data store 122 maintains current vehicle information 118, an identifier of the vehicle 102), and may receive a response from the update server 126 indicative of whether new software updates 120 for the vehicle 102 are available (e.g., as links or other identifiers of software updates 120 for the vehicle 102 to download). If the response to the update application 128 indicates software updates 120 are available for the vehicle 102, the update application 128 may be further configured to download and install the indicated updates, or in other cases queue the software updates 120 to be downloaded and installed.

The update application 128 may be configured to facilitate the downloading of the software updates 120 to the vehicle 102. For instance, the update application 128 may be configured to receive a listing of the software update 120 identified by the update server 126 as being available for download and install. The update application 128 may be further configured to detect when the vehicle 102 is connected to network 116 (e.g., via the modem 114), and perform downloading of the software update 120 when connected.

The update application 128 may be further configured to facilitate the decryption and installation of the downloaded software updates 120. For example, as discussed in detail in the disclosure, the update management application 220 may be configured to decrypt the downloaded software updates 120 according to the long key 124 maintained by the vehicle 102 and used to encrypt the software updates 120 for transport between the vehicle 102 and the update server 126.

Figure 2:
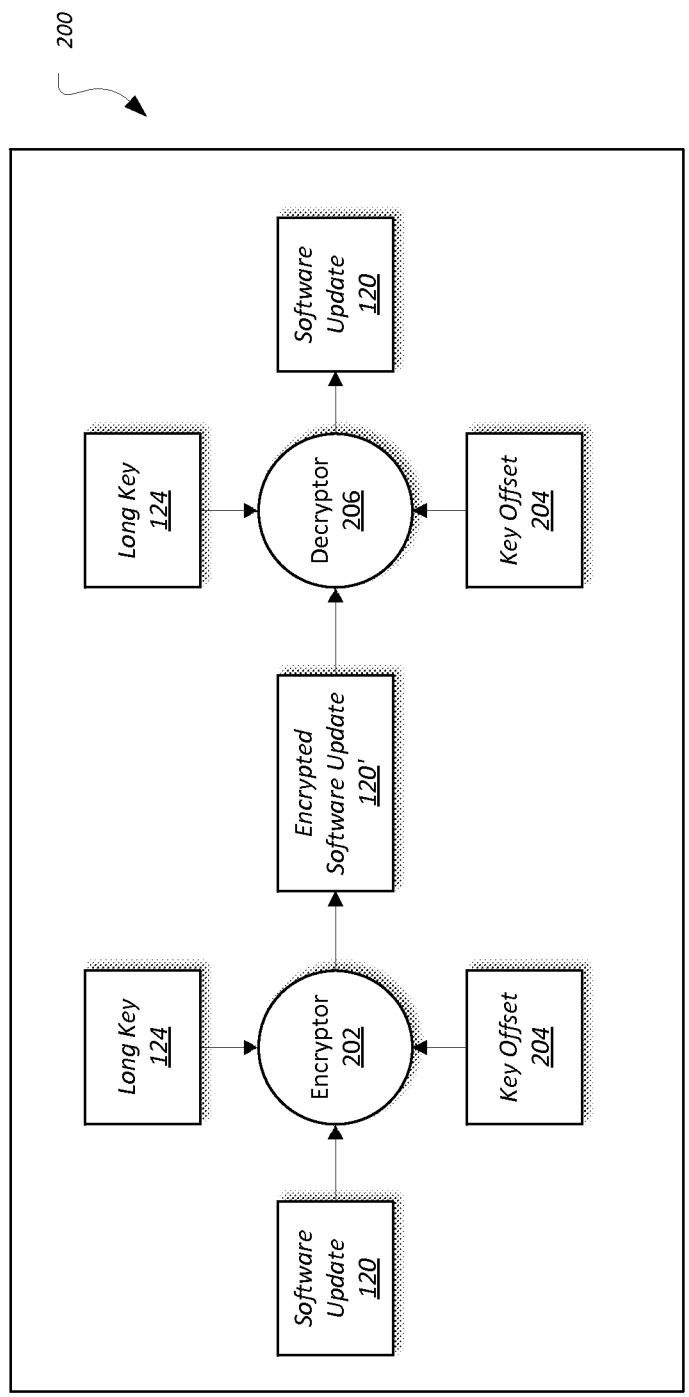
FIG. 2 illustrates an example diagram of encryption and decryption of a software update.

FIG. 2 illustrates an example diagram 200 of encryption and decryption of a software update 120. As shown, the encryptor 202 may be configured to generate an encrypted software update 120' using the software update 120, the long key 124, and a key offset 204 into the long key 124. Moreover, the decryptor 206 may be configured to regenerate the original software update 120 using the encrypted software update 120', the long key 124, and the key offset 204. In an example, the update server 126 may perform the operations of the encryptor 202 before providing a software update 120 to the vehicle 102, and the update application 128 may perform the operations of the decryptor 206 for received encrypted software updates 120' to be installed to the vehicle 102.

The update server 126 may identify the proper long key 124 for the vehicle 102 according to vehicle information 118 included in an update request 130 sent from the vehicle 102 to the update server 126. In an example, the update server 126 may retrieve the long key 124 from the data store 122 according to a VIN of the vehicle 102 included in the vehicle information 118 of the update request 130. Prior to transmission of the requested software update 120 to the vehicle 102, the update server 126 may encrypt the software update 120 using the identified long key 124 associated with the vehicle 102.

The update server 126 may also determine the key offset 204 according to the update request 130. For example, the update request 130 sent from the vehicle 102 to the update server 126 may also include a timestamp value known to both the vehicle 102 and the update server 126. This timestamp value may be used to determine the key offset 204 into the long key 124 to use for the encryption and decryption operations, rather than having the encryptor 202 and decryptor 206 utilize the long key 124 from the beginning of the long key 124 each use. In an example, the update server 126 may utilize the timestamp value to generate a number that may be used as an offset into the long key 124. Use of the key offset 204 may accordingly protect the beginning of the long key 124 from being reused for each software update 120 and potentially becoming vulnerable to attack (e.g., if the software update 120 is often all zeros or a known initial signature at the beginning, the initial bytes of the long key 124 may be exposed repeatedly).

Having identified the appropriate long key 124 and key offset 204, the update server 126 may encrypt each byte of the software update 120 using a different byte of the long key 124. For instance, the update server 126 may generate a first byte of the encrypted software update 120' by adding a first byte of the software update 120 to the first byte of the long key 124 at the key offset 204, and may generate the second byte of the encrypted software update 120' by adding a second byte of the software update 120 to the second byte of the long key 124 at the key offset 204. In another example, the update server 126 may generate a first byte of the encrypted software update 120' by XORing a first byte of the software update 120 with the first byte of the long key 124 at the key offset 204, and may generate the second byte of the encrypted software update 120' by XORing a second byte of the software update 120 with the second byte of the long key 124 at the key offset 204. The update server 126 may continue generating of the encrypted software update 120' in such a manner until the software update 120 is fully encrypted into the encrypted software update 120'.

FIG. 3A illustrates an example 300-A key offset 204-A into the long key 124 for encryption or decryption of the software update 120. As shown, the key offset 204-A is to a location near the beginning of the long key 124. The software update 120 may accordingly be encrypted using the bytes of the long key 124 beginning at the key offset 204-A, and continuing sequentially for the length of the software update 120.

FIG. 3B illustrates an alternate example 300-B key offset 204-B into the long key 124 for encryption or decryption of the software update 120. As shown, the key offset 204-B is to a location near the end of the long key 124. Thus, as the end of the long key 124 is reached before the end of the software update 120, the long key 124 "rolls" over to the beginning. This rolling over accordingly allows the encryptor 202 and decryptor 206 to continue processing the software update 120 despite the end of the long key 124 having been reached. For instance, a first portion of the software update 120-1 is processed using the end of the long key 124, and a second portion of the software update 120-2 is processed using the beginning of the long key 124.

FIG. 4 illustrates an example process 400 for encryption of software updates 120 by the update server 126. As shown, the process 400 may be performed by the update server 126 in communication with the vehicle 102 over the network 116 acting as the encryptor 202.

At operation 402, the update server 126 receives the update request 130 from the vehicle 102. As some examples, the update request 130 may be received from the vehicle 102 periodically, after a predetermined number of vehicle 102 key cycles, after the vehicle 102 drives a predetermined distance since the last update, or after a predetermined amount of time since the last update. The update request 130 may include vehicle information 118 specifying one or more vehicle 102 identifiers, such as vehicle 102 VIN.

At operation 404, the update server 126 identifies the software update 120 to apply to the vehicle 102. In an example, based on the current vehicle configuration information, the update server 126 may be configured to determine whether there are software updates 120 available to update an old version of software installed to one of the vehicle ECUs 104 from the version specified in the data store 122 to a more recent version. As another example, the vehicle 102 may determine, based on querying the update server 126 or another source, that software updates 120 should be installed to the vehicle 102, and may provide indications of the requested software updates 120 in the update request 130.

At operation 406, the update server 126 identifies the long key 124 to use to encrypt the software update 120. For example, the update server 126 may retrieve the long key 124 associated with the vehicle 102 from the data store 122 based on the vehicle information 118 included in the update request 130.

At operation 408, the update server 126 identifies the key offset 204 into the long key 124 to use to encrypt the software update 120. For example, the update request 130 sent from the vehicle 102 to the update server 126 may include a timestamp value known to both the vehicle 102 and the update server 126. The update server 126 may accordingly utilize the timestamp value to generate a number that may be used as the key offset 204 into the long key 124.

At operation 410, the update server 126 encrypts the software update 120. For example, having identified the appropriate long key 124 and key offset 204, the update server 126 may encrypt each byte of the software update 120 using a different byte of the long key 124.

At operation 412, the update server 126 sends the encrypted software update 120' to the vehicle 102. Accordingly, the update server 126 may respond to the update request 130 with the encrypted software update 120' keyed to the specific vehicle 102 providing the update request 130. After operation 412, the process 400 ends.

FIG. 5 illustrates an example process 500 for decryption and installation of software updates 120 by the vehicle 102. As shown, the process 500 may be performed by the vehicle 102 in communication with the update server 126 over the network 116 acting as the decryptor 206.

At operation 502, the vehicle 102 sends the update request 130 to the update server 126. As some examples, the update application 128 of the telematics control unit 108 may generate an update request 130 periodically, after a predetermined number of vehicle 102 key cycles, after the vehicle 102 drives a predetermined distance since the last update, or after a predetermined amount of time since the last update. The update request 130 may include, for example, one or more vehicle 102 identifiers, such as vehicle 102 VIN.

At operation 504, the vehicle 102 receives the encrypted software update 120' from the update server 126. In an example, the vehicle 102 receives the encrypted software update 120' in accordance with the process 400 discussed in detail above.

At operation 506, the vehicle 102 identifies the long key 124 to use to encrypt the software update 120. For example, the update application 128 may retrieve the long key 124 from the storage device 112 of the telematics control unit 108.

At operation 508, the vehicle 102 identifies the key offset 204 into the long key 124 to use to encrypt the encrypted software update 120'. For example, the update request 130 sent from the vehicle 102 to the update server 126 may include a timestamp value known to both the vehicle 102 and the update server 126. The update application 128 may accordingly utilize the timestamp value to generate the same key offset 204 into the long key 124 as generated by the update server 126 in the process 400 to encrypt the software update 120.

At operation 510, the vehicle 102 decrypts the encrypted software update 120'. For example, having identified the appropriate long key 124 and key offset 204, the update application 128 may decrypt each byte of the encrypted software update 120' using a different byte of the long key 124.

At operation 512, the vehicle 102 installs the software update 120 to the vehicle 102. In an example, the update application 128 may send the decrypted software update 120 to the vehicle ECUs 104 to be updated. In another example, the software update 120 may be an update to the telematics control unit 108, and the update application 128 may install the software update 120 to the telematics control unit 108. After operation 512, the process 500 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle system comprising:
   a processor configured to
      receive an encrypted software update responsive to an update request to an update server,
      identify a key offset into a long key, the long key corresponding to a vehicle identifier and stored to the vehicle, according to a timestamp of the update request, and
      decrypt the encrypted software update according to the long key indexed to the key offset using a reverse of a mathematical operation used to encrypt the software update with the long key.

2. The system of claim 1, wherein the processor is included within a telematics unit of the vehicle configured to communicate with the update server over a communications network.

3. The system of claim 1, wherein the long key includes a random string of bytes at least as long as a length in bytes of the encrypted software update.

4. The system of claim 1, wherein the mathematical operation is one of addition and exclusive or.

5. The system of claim 1, wherein the processor is further configured to send the software update to a vehicle electronic control unit (ECU) for installation to the ECU.

6. The system of claim 1, wherein the processor is further configured to send the update request at least one of periodically, after a predetermined number of vehicle key cycles, after the vehicle drives a predetermined distance since a last update, or after a predetermined amount of time since the last update.

7. A system comprising:
a processor configured to
receive, from a vehicle, an update request including a timestamp and a vehicle identifier;
retrieve a long key according to the vehicle identifier;
identify a key offset into the long key according to a timestamp of the update request; and
using a reversible mathematical operation, encrypt a software update into an encrypted software update to send to the vehicle using the long key indexed to the key offset.

8. The system of claim 7, wherein the processor is further configured to retrieve the long key from a data store based on the vehicle identifier.

9. The system of claim 7, wherein the long key includes a random string of bytes at least as long as a length in bytes of the software update.

10. The system of claim 7, wherein the mathematical operation is one of addition and exclusive or.

11. The system of claim 7, wherein the processor is further configured to send the encrypted software update to the vehicle responsive to the update request for installation to the vehicle.

12. A computer-implemented method for a vehicle comprising:
receiving, by a processor, an encrypted software update responsive to an update request to an update server;
identifying, by the processor, a key offset into a long key, the long key corresponding to a vehicle identifier and stored to the vehicle, according to a timestamp of the update request; and
decrypting, by the processor, the encrypted software update according to the long key indexed to the key offset by performing a reverse of a mathematical operation performed using the software update and the long key to encrypt the encrypted software update.

13. The method of claim 12, wherein the processor is included within a telematics unit of the vehicle configured to communicate with the update server over a communications network.

14. The method of claim 12, wherein the long key includes a random string of bytes at least as long as a length in bytes of the encrypted software update.

15. The method of claim 12, wherein the mathematical operation is one of addition and exclusive or.

16. The method of claim 12, further comprising sending the software update to a vehicle electronic control unit (ECU) for installation to the ECU.

17. The method of claim 12, further comprising sending the update request at least one of periodically, after a predetermined number of vehicle key cycles, after the vehicle drives a predetermined distance since a last update, or after a predetermined amount of time since the last update.

* * * * *